United States Patent
Rangaswamy et al.

(10) Patent No.: US 6,293,363 B1
(45) Date of Patent: Sep. 25, 2001

(54) INTEGRATED ELECTRONIC SHIFT AND PARKING BRAKE SYSTEM, INCLUDING SECURITY INTERLOCK, FOR MOTOR VEHICLES

(75) Inventors: Priya Rangaswamy; Eric Anthony Trujillo, both of Farmington Hills; Kevin Michael Bullister, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/334,407

(22) Filed: Jun. 16, 1999

(51) Int. Cl.[7] .............................. B60R 25/00; B62H 5/00
(52) U.S. Cl. ........................................... 180/287; 188/158
(58) Field of Search .................................. 188/156, 158, 188/72.8; 477/9, 18, 20, 23, 29, 53, 70; 116/28.1; 340/457.3; 180/287

(56) References Cited

U.S. PATENT DOCUMENTS

| | | | |
|---|---|---|---|
| 3,684,049 | 8/1972 | Kimura | 180/103 |
| 3,788,422 * | 1/1974 | Bowler | 180/287 |
| 3,874,468 | 4/1975 | Chatterjea | 180/103 |
| 4,258,819 | 3/1981 | Baptiste, Sr. | 180/287 |
| 4,327,414 | 4/1982 | Klein | 364/426 |
| 4,629,043 | 12/1986 | Matsuo et al. | 192/4 A |
| 4,658,939 | 4/1987 | Kircher et al. | 188/156 |
| 4,669,570 * | 6/1987 | Perrret | 180/287 |
| 4,691,801 * | 9/1987 | Mann | 180/287 |
| 4,777,377 | 10/1988 | Jeter | 307/10 AT |
| 4,793,447 * | 12/1988 | Taig | 188/72.1 |
| 4,834,207 * | 5/1989 | Havenhill | 180/287 |
| 4,884,057 | 11/1989 | Leorat | 340/52 R |
| 4,892,014 | 1/1990 | Morell et al. | 74/866 |
| 5,180,038 * | 1/1993 | Arnold | 188/171 |
| 5,335,743 | 8/1994 | Gillbrand et al. | 180/178 |
| 5,366,281 * | 11/1994 | Littlejohn | 303/3 |
| 5,399,002 | 3/1995 | Taylor | 303/89 |
| 5,413,197 * | 5/1995 | Baer | 188/353 |
| 5,431,607 | 7/1995 | Alder et al. | 477/4 |
| 5,467,275 * | 11/1995 | Takamoto | 364/426.01 |
| 5,477,939 * | 12/1995 | Childress | 180/287 |
| 5,498,216 * | 3/1996 | Bitsche | 477/20 |
| 5,570,756 | 11/1996 | Hatcher | 180/287 |
| 5,659,471 | 8/1997 | Parmee et al. | 364/424.045 |
| 5,675,190 | 10/1997 | Morita | 307/10.1 |
| 5,696,679 | 12/1997 | Marshall et al. | 364/424.082 |
| 5,704,693 | 1/1998 | Mackiewicz | 303/3 |
| 5,785,157 | 7/1998 | Scott et al. | 188/156 |
| 5,829,845 | 11/1998 | Maron et al. | 303/20 |
| 5,839,304 * | 11/1998 | Wills | 70/175 |
| 5,925,940 * | 7/1999 | Donatelle et al. | 307/10.2 |
| 6,012,556 * | 1/2000 | Blosch | 188/71.8 |

FOREIGN PATENT DOCUMENTS

363255258 * 10/1988 (JP) .

* cited by examiner

Primary Examiner—J. J. Swann
Assistant Examiner—David Divine
(74) Attorney, Agent, or Firm—Gregory P. Brown; William J. Coughlin

(57) ABSTRACT

An electric park brake control (32) for a parking brake actuator (28, 30) selectively operates a brake mechanism (24, 26) at at least one wheel to selectively perform a parking brake function. Inputs to the electric park brake control include an input from a shifter (18) for distinguishing PARK position from other positions. The electric park brake control causes the brake mechanism to perform the parking brake function when the input from the shifter to the electric park brake control discloses that the shifter is in PARK position. The electric parking brakes are integrated with the shifter, eliminating a parking pawl from a motor (12) that propels the vehicle. Neither is an operating cable from the shifter to the motor for operating the parking pawl required. The shifter is coupled in exclusively electrical relationship to a traction inverter module (16) for causing the motor to operate in correspondence with the particular position selected by the shifter. A security controller (50) causes the electric park brake control to apply the parking brake when a security violation is detected.

6 Claims, 2 Drawing Sheets

INTEGRATED ELECTRONIC SHIFT AND PARKING BRAKE SYSTEM, INCLUDING SECURITY INTERLOCK, FOR MOTOR VEHICLES

BACKGROUND OF THE INVENTION

1. Field of the Invention

This invention relates to motor vehicles, and more particularly to an integrated electronic shift and parking brake system, including a security interlock in one embodiment, for a motor vehicle, especially one whose prime mover comprises an electric traction motor.

2. Background Information

A known vehicle that is powered by an electric traction motor comprises a shifter that is operated by a driver of the vehicle to select one of several positions that establish different modes of operating the motor in relation to the vehicle drivetrain. A representative set of positions comprises PARK, REVERSE, NEUTRAL, DRIVE, and ECONOMY positions. In both PARK and NEUTRAL positions, the motor is unable to propel the vehicle. In REVERSE position, the motor can act through the drivetrain to deliver traction torque for propelling the vehicle in reverse. DRIVE and ECONOMY positions represent two different forward drive positions in which the motor can deliver traction torque to propel the vehicle forward.

As the shifter is moved to different positions, a cable couples the shifter motion to a parking pawl on the motor, turning the pawl in correspondence with the shifter motion. The turning of the parking pawl also turns an attached sensor which is electrically coupled to a traction control module that controls the motor. The sensor sends an electric signal to the module corresponding to the position selected by the shifter. The module contains software which acts upon the sensor signal to operate the motor in accordance with the position selected by the shifter.

The known vehicle also comprises a parking brake system that is operated by a handbrake lever to selectively apply and release one or more wheel brakes. When a driver operates the handbrake lever to apply the parking brake, the lever pulls a cable that causes drum brakes of the two rear of wheels of the vehicle to be applied. When the driver releases the parking brake, a spring mechanism releases the drum brakes so that they cease to be applied.

When the vehicle is stopped, the parking brake may be applied to prevent the vehicle from rolling, for example when the vehicle is parked on an inclined surface. The parking brake may also be applied to slow the vehicle when the vehicle is in motion.

Documents mentioned in an Information Disclosure Statement were developed in consequence of a novelty search with respect to the present invention, and they are believed representative of the state of the art.

SUMMARY OF THE INVENTION

Briefly, one general aspect of the invention relates to a motor vehicle comprising: wheels that support the vehicle for rolling motion on an underlying surface; an electric traction motor that drives driven ones of the wheels through a drivetrain and that is operated by a shifter to a selected one of multiple positions including a PARK position; brake mechanisms at the wheels; a parking brake actuator that is associated with at least one of the brake mechanisms and that is effective to operate the at least one brake mechanism to perform a parking brake function; a service brake system that is associated with the brake mechanisms and that is effective to operate the brake mechanisms to perform a service brake function; an electric motor control for controlling operation of the traction motor; inputs to the electric control including an input from the service brake system for distinguishing between performance and non-performance of the service brake function and an input from the shifter for distinguishing positions of the shifter; an electric park brake control for the parking brake actuator for selectively operating the at least one brake mechanism to selectively perform the parking brake function; inputs to the electric park brake control including an input from the shifter for distinguishing PARK position from other positions; and wherein the electric park brake control causes the brake mechanism at the at least one wheel to perform the parking brake function when the input from the shifter to the electric park brake control discloses that the shifter is in PARK position.

Another general aspect relates to a motor vehicle comprising: wheels that support the vehicle for rolling motion on an underlying surface; a powertrain, including a prime mover, that drives driven ones of the wheels; a shifter that operates place the powertrain in a selected one of multiple positions including a PARK position; brake mechanisms at the wheels; a parking brake actuator that is associated with at least one of the brake mechanisms and that is effective to operate the at least one brake mechanism to perform a parking brake function; a service brake system that is associated with the brake mechanisms and that is effective to operate the brake mechanisms to perform a service brake function; an electric park brake control for the parking brake actuator for selectively operating the at least one brake mechanism to selectively perform the parking brake function; inputs to the electric park brake control including an input from the shifter for distinguishing PARK position from other positions, wherein the electric park brake control causes the brake mechanism at the at least one wheel to perform the parking brake function when the input from the shifter to the electric park brake control discloses that the shifter is in PARK position; and a security controller for disclosing a violation of security of the vehicle to the electric park brake control, wherein the electric park brake control causes the brake mechanism at the at least one wheel to perform the parking brake function when the security controller discloses a security violation.

Further aspects will be seen in the ensuing description, claims, and accompanying drawings.

BRIEF DESCRIPTION OF THE DRAWINGS

The drawings that will now be briefly described are incorporated herein to illustrate preferred embodiments of the invention and a best mode presently contemplated for carrying out the invention.

DESCRIPTION OF THE PREFERRED EMBODIMENT(S)

Figure 1:
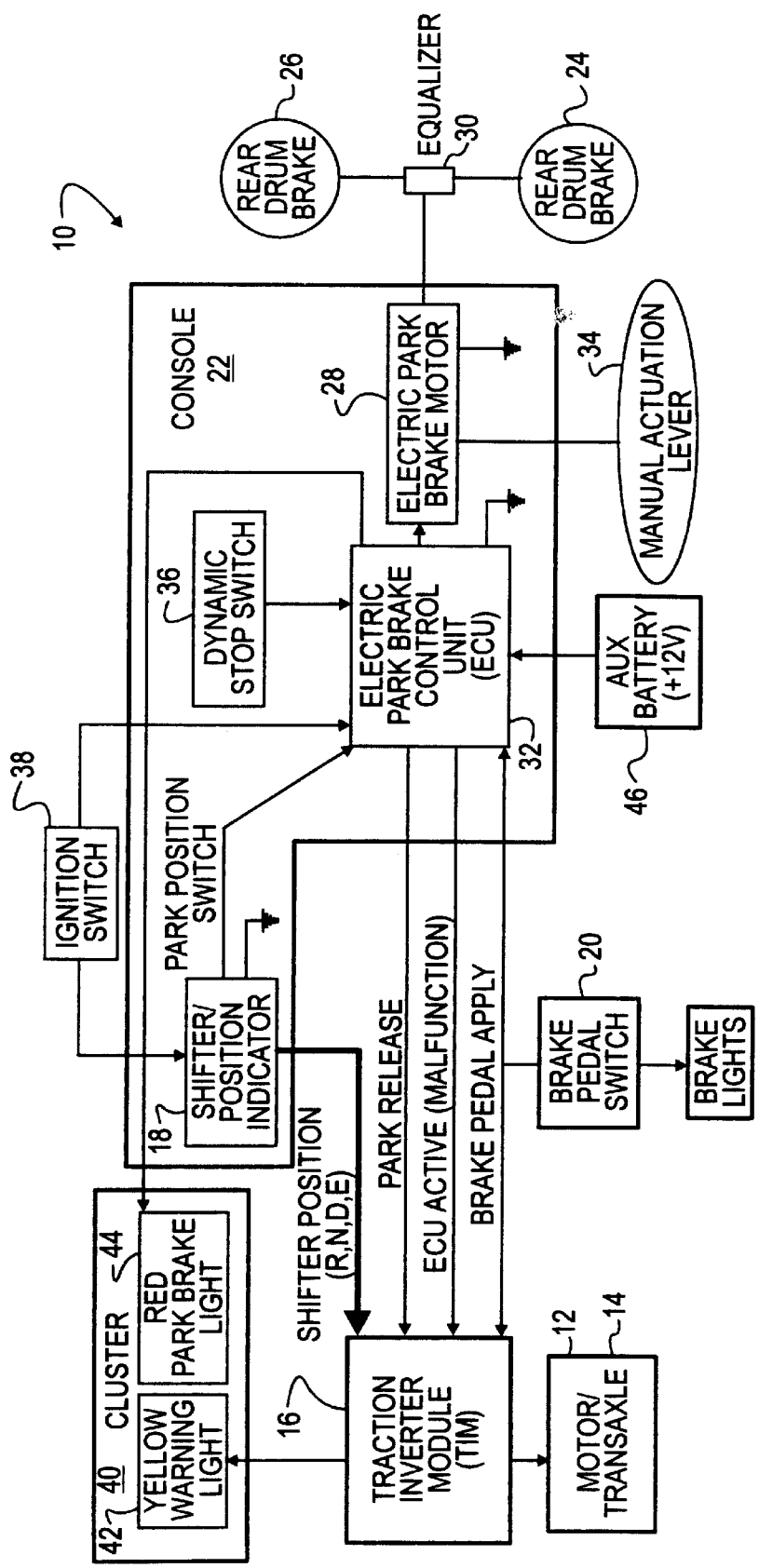
FIG. 1 is a schematic block diagram of an example of a first embodiment of the present invention.

FIG. 1 shows an integrated electronic shift and parking brake system 10 in a motor vehicle comprising a powertrain that has an electric motor 12, an A.C. motor for example, as the prime mover. Motor 12 drives road-engaging wheels through a drivetrain, for example a drivetrain that comprises a transaxle 14.

A traction inverter module (T.I.M.) 16 converts D.C. electric power into A.C. electric power for operating motor 12. For example, D.C. electric power may be obtained from an on-board storage battery, or batteries. T.I.M. 16 receives various inputs, including an input from a shifter 18 of the vehicle and an input from a brake pedal switch 20.

Shifter 18, which may be mounted in a driver's console 22 of the vehicle for example, is selectively operated, by a shift lever for example, to select a particular one of a number of available positions. A representative set of available positions comprises PARK, REVERSE, NEUTRAL, DRIVE, and ECONOMY positions. In both PARK and NEUTRAL positions, motor 12 is unable to propel the vehicle. In REVERSE position, motor 12 is in driving relation through the drivetrain to driven wheels to deliver traction torque to those wheels for propelling the vehicle in reverse. DRIVE and ECONOMY positions represent two different forward drive positions in which motor 12 can deliver traction torque to propel the vehicle forward. The input to T.I.M. 16 from shifter 18, which may be provided by an associated sensor, serves to identify to T.I.M. 16 which one of the selected positions is being selected by shifter 18. A position indicator is associated with shifter 18 to disclose to the driver the particular position being selected.

Brake pedal switch 20 is actuated whenever the driver depresses a foot-pedal to apply the service brakes. Actuation of switch 20 also illuminates the vehicle's brake lights.

The vehicle further includes an electric parking brake system which comprises a parking brake mechanism associated with at least one wheel of the vehicle. The actual brake mechanism that may be employed at a particular wheel of the vehicle to perform the parking brake function may be the service brake mechanism for that wheel. In other words, a single brake mechanism at a wheel may be capable of performing both a service brake function and a parking brake function. Alternatively, the parking brake function may be performed by a parking brake mechanism devoted exclusively to performing the parking brake function, in which case the service brake function is performed by a separate service brake mechanism at the wheel.

FIG. 1 shows an example where each of two rear wheels has a respective drum brake mechanism 24, 26 that performs both service and parking brake functions. The example further comprises an electric park brake motor 28 that is mechanically coupled to brake mechanisms 24, 26, such as through an equalizer 30. Detail of the service brake system for operating brake mechanisms 24, 26 as service brakes is not shown, but is conventional. The service brakes can be applied by the driver depressing the brake foot pedal which acts via hydraulic fluid coupling to operate brake mechanisms 24, 26. The brake force applied at each wheel depends on the force with which the pedal is depressed.

Operation of electric park brake motor 28 is controlled by an electric park brake control unit (ECU) 32 to selectively operate brake mechanisms 24 and 26 in unison so as to cause the parking brake to be either applied or not applied. For back-up purposes in the event that ECU 32 is unable to operate parking brake mechanisms 24 and 26, such as in the event of a dead battery for example, motor 28 may be manually actuated by a tool, such as by a manual actuation lever 34.

There are several inputs to ECU 32, including an input from shifter 18 that distinguishes the shifter being in PARK position. ECU 32 causes park brake mechanisms 24, 26 to be applied when the shifter signals the ECU that the shifter is in PARK position.

Another input to ECU 32 is a dynamic stop switch 36. Still another input to ECU 32 is brake pedal switch 20. ECU 32 also furnishes two additional signals for T.I.M. 16: a Park Release signal; and an ECU Active signal.

An ignition switch 38 of the vehicle, such as an on-off switch, controls the application of power to shifter 18 and ECU 32, delivering power only when in ON position. An instrument cluster 40 of the vehicle contains two indicators 42, 44, lamps for example, each of which is respectively associated with T.I.M. 16 and ECU 32 respectively.

By integrating electric parking brakes with shifter 18, motor 12, unlike previous motors, requires no parking pawl, nor is an operating cable from shifter 18 to motor 12 for operating the parking pawl required. Shifter 18 is coupled in exclusively electrical relationship to T.I.M. 16 for causing motor 12 to operate in correspondence with the particular position selected by shifter 18.

ECU 32 is coupled exclusively electrically to shifter 18, being coupled to the sensor that is associated with the shifter to signal the particular position selected by the shifter. When shifter 18 is in PARK position, ECU 32 processes the corresponding signal from the associated sensor to operate electric park brake motor 28 in a manner that causes brake mechanisms 24 and 26 to perform a parking brake function. Once the brake mechanisms have been so operated, motor 28 is shut off to conserve power. Because of the nature of the mechanism that couples motor 28 with brake mechanisms 24 and 26, the brakes remain applied without further consumption of electric power until they are released. During this time, ignition switch 38 may be turned off without causing release of the parking brake.

Before the vehicle is once again driven however, the parking brake must be released. Ignition switch 38 must be turned on to allow ECU 32 to operate. Movement of shifter 18 out of PARK position is detected by ECU 32, which then operates motor 28 in a manner that causes brake mechanisms 24, 26 to be released. Once those mechanisms have been operated to release the parking brake, motor 28 is shut down.

T.I.M. 16 may also be interlocked with ECU 32. The interlock is provided by the signal furnished from ECU 32 to T.I.M. 16. A strict interlock may be provided by allowing T.I.M. to operate motor 12 only when both ECU 32 signals T.I.M. 16 that the parking brakes have been released and the sensor associated with shifter 18 indicates that the shifter is in other than PARK position. Hence, failure of ECU 32 to indicate that the parking brakes have been released will be ineffective to allow the vehicle to be driven, even though the signal from the sensor associated with shifter 18 may be indicating selection of a position that allows motor 12 to propel the vehicle.

If the parking brakes fail to be released by ECU 32, then manual actuation lever 34 may be operated to mechanically release them. A strict interlocking of T.I.M. 16 by ECU 32 requires an override that will allow T.I.M. 16 to operate motor 12 after the parking brakes have been mechanically released by lever 28. If such an interlock were not provided, the signal from the sensor associated with shifter 18 would be sufficient by itself to exercise control over T.I.M. 16 for the purpose of allowing motor 12 to operate.

Under certain driving circumstances, a driver of a moving vehicle may desire to utilize the parking brake for braking the vehicle. Dynamic stop switch 36 allows that function to be implemented via ECU 32. A particular strategy for implementing the function may be established by the particular software embodied in ECU 32. One example of a strategy comprises ECU being programmed to cause static braking when vehicle speed is below a certain speed and dynamic braking when vehicle speed is above that speed.

If a dead vehicle battery is the cause of ECU 32 being unable to operate motor 28, an auxiliary battery 46 may be connected to the ECU to provide power. If there is a fault in ECU 32, a signal may be furnished to T.I.M. 16.

Figure 2:
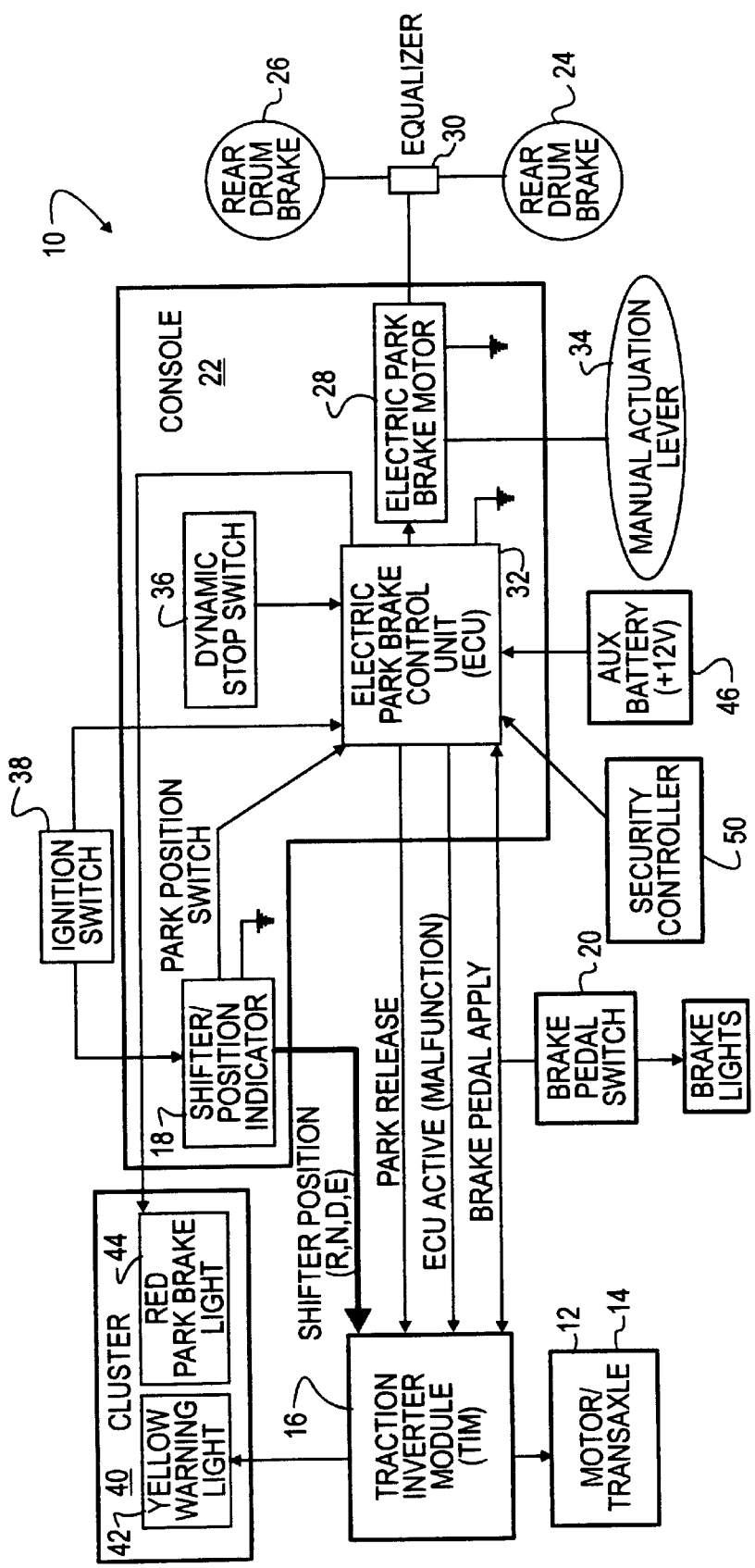
FIG. 2 a schematic block diagram of an example of a second embodiment of the present invention.

FIG. 2 illustrates a second embodiment that is like the embodiment of FIG. 1 except for the inclusion of a vehicle security controller 50. The same reference numerals that were used in FIG. 1 are used in FIG. 2 to identify the same components. Hence, the description of FIG. 1 given above applies to FIG. 2 without repetition. The latter Figure will be described to the extent of explaining how security controller 50 interacts in the system.

Security controller 50 represents any of various vehicle security systems that are intended to thwart unauthorized vehicle usage, such as vehicle theft. When controller 50 detects a security violation, it delivers a corresponding signal to ECU 32. In response to that signal, ECU 32 operates motor 28 to cause the parking brake to be applied in the manner described above. Hence, if an event, such as unauthorized entry into or attempted use of a parked vehicle occurs, and that event is detected by the security system, controller 50 causes the parking brake to be applied. Therefore even if the vehicle has been started, subsequent driving would be difficult due to resistance being applied by the parking brake. It is believed that integration of a security controller with an electric shifter and parking brake system may be useful with vehicles having other than an electric traction motor as the prime mover.

While a presently preferred embodiment has been illustrated and described, it is to be appreciated that the invention may be practiced in various forms within the scope of the following claims.

What is claimed is:

1. A motor vehicle comprising: wheels that support the vehicle for rolling motion on an underlying surface; a powertrain, including a prime mover, that drives driven ones of the wheels; a shifter that operates to place the powertrain in a selected one of multiple positions including a PARK position; brake mechanisms at the wheels; a parking brake actuator that is associated with at least one of the brake mechanisms and that is effective to operate the at least one brake mechanism to perform a parking brake function; a service brake system that is associated with the brake mechanisms and that is effective to operate the brake mechanisms to perform a service brake function; an electric park brake control for the parking brake actuator for selectively operating the at least one brake mechanism to selectively perform the parking brake function; inputs to the electric park brake control including an input from the shifter for distinguishing PARK position from other positions, wherein the electric park brake control causes the brake mechanism at the at least one wheel to perform the parking brake function when the input from the shifter to the electric park brake control discloses that the shifter is in PARK position; and a security controller for disclosing a violation of security of the vehicle to the electric park brake control, wherein the electric park brake control causes the brake mechanism at the at least one wheel to perform the parking brake function in response to the security controller disclosing a security violation.

2. A motor vehicle as set forth in claim 1 in which the prime mover comprises an electric traction motor that drives the driven ones of the wheels through a drivetrain; an electric motor control for controlling operation of the traction motor; and inputs to the electric control including an input from the service brake system for distinguishing between performance and non-performance of the service brake function and an input from the shifter for distinguishing positions of the shifter.

3. A motor vehicle as set forth in claim 2 in which the at least one brake mechanism for performing a parking brake function also performs a service brake function when the service brake system operates to perform the service brake function.

4. A motor vehicle as set forth in claim 3 including a service brake switch that is actuated when the service brake function is performed, and a dynamic stop switch that is independent of the service brake switch for causing the electric park brake control to apply the at least one brake mechanism.

5. A motor vehicle as set forth in claim 4 in which the service brake switch provides an input to both the electric park brake control and the motor control.

6. A motor vehicle as set forth in claim 1 in which the powertrain comprises an electric motor for the prime mover.

* * * * *